Patented Aug. 31, 1954

2,688,041

UNITED STATES PATENT OFFICE 2,688,041

TELLURIUM CATALYST AND METHOD OF SELECTIVE OXIDATION

William R. Middleton, Wenonah, N. J., assignor to Socony-Vacuum Oil Company, Incorporated, a corporation of New York No Drawing. Application January 26, 1951,
Serial No. 208,073

10 Claims. (Cl. 260—590)

The present invention relates to selective oxidation of activated methyl and methylene groups by oxygen-containing gas in the presence of a novel promoted or mixed catalyst containing an oxide of vanadium and the balance predominantly at least one oxide of tellurium.

In the co-pending application Serial No. 139,529 filed January 19, 1950, now U. S. Patent No. 2,648,638 in the name of Frederick P. Richter, it has been disclosed that the activated methyl group or the activated methylene group of an organic substance can be selectively oxidized in the presence of a catalyst comprising predominantly at least one oxide of tellurium to a carbonyl group. The present invention relates thereto and represents the application of the discovery that the addition of vanadium oxide to the catalyst disclosed in application Serial No. 139,529 provides an improved catalyst for the reactions disclosed in the earlier filed application.

It is to be understood that the phrase "gas containing free oxygen" includes elemental oxygen, pure diatomic oxygen, diatomic oxygen diluted with an inert gas such as nitrogen, helium, carbon dioxide, the triatomic oxygen or ozone and air.

It is also to be understood that the catalysts described hereinafter can be used in the unsupported state or supported by materials which are inert or materials which are active. The unsupported catalyst can be used in finely divided form suitable for "fluid" systems wherein the catalyst flows from one part of the system to the other in a stream of gas or as large particles.

Active supports are those which, like silica gel, per se accelerate the oxidation of olefins to CO, $CO_2$ and $H_2O$.

Inert supports are those such as "fused" alumina (available as Tabular Alumina) which per se do not accelerate oxidation reactions.

As described in the co-pending application Serial No. 139,529 many classes of compounds having activated methyl or methylene groups can be selectively oxidized to carbonyl compounds.

Broadly illustrative of the classes of compounds which may be oxidized in this manner and the products obtained are the following equations:

(1) 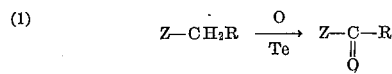

where Z is a monovalent radical having at least one center of unsaturation such as C=O; a group capable of oxidation to a carbonyl group, for example a hydroxyl group; C≡C; C=C; or the double bond of an aryl group directly adjacent to the methyl or methylene group and R is hydrogen or alkyl or cycloalkyl or aryl or alicyclic or heterocyclic; when R is other than hydrogen it can be substituted by any substituent which will survive under the reaction conditions, for example, a phenyl group, a halogen, a nitro group and the like.

(1)

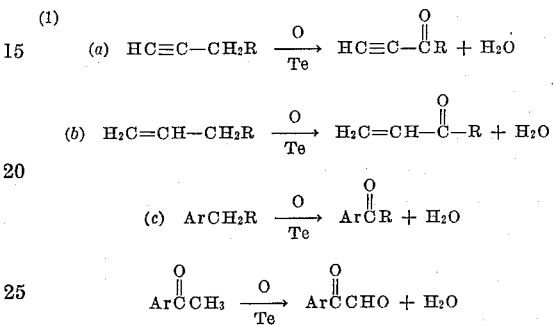

where Ar is an aryl radical substituted or unsubstituted.

(2)

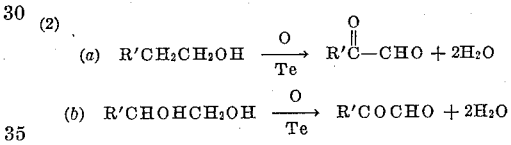

where R' is hydrogen, alkyl, cycloalkyl, aryl, heterocyclic and where other than hydrogen may be substituted by any substituent which will survive under the reaction conditions, for example, a phenyl group, a halogen, a nitro group and the like.

It will be recognized that in the foregoing

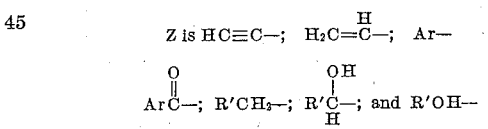

(3) Compounds containing a center of unsaturation such as the double bond of an aryl group as an integral part of an alicyclic ring system directly adjacent a methyl or methylene group:

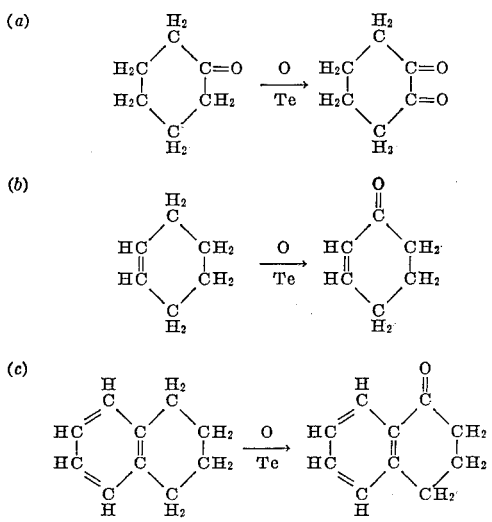

It is to be noted that

has been used in the foregoing equations to indicate a reaction taking place in the presence of a gas containing free oxygen as defined hereinbefore and a catalyst comprising an oxide of vanadium and the balance predominantly at least one oxide of tellurium.

An organic carbonyl group is a group which exists in that state of oxidation which is intermediate of a primary or secondary alcohol and a carboxylic acid.

It has been discovered that the method of selectively oxidizing the activated methyl or methylene groups of an organic compound to a carbonyl group with gas containing free oxygen in the presence of a catalyst comprising predominantly at least one oxide of tellurium can be improved with respect to conversion by incorporating in the tellurium catalyst at least about 2 mole per cent of at least one oxide of vanadium.

The promoted or mixed catalysts which have been found capable of producing the improved results to which reference has been made hereinbefore can be prepared in accordance with well established principles and can be used in the unsupported form or in the supported form.

For example, a suitable catalyst can be prepared by dissolving vanadium pentoxide ($V_2O_5 \cdot 1.5\ H_2O$) in a minimum amount of 39 per cent aqueous hydrochloric acid (about 4 cc. per gram of oxide). The solution is then heated, say, on a hot water bath until the oxide is converted to the oxychloride (vanadyl chloride $VOCl_2$); this requires about 1 to 1.5 hours. The solution of vanadyl chloride thus formed is added to a stirred, preferably concentrated, aqueous solution of telluric acid. The vanadyl chloride is added to the telluric acid solution in amount to yield a mixture containing about 2 to about 40, preferably about 5 to about 20, mole per cent of an oxide of vanadium based upon the tellurium oxide.

When the catalyst is to be used in the unsupported form the mixture of vanadyl chloride and telluric acid is evaporated to dryness and the residue ground to the desired particle size.

When the catalyst is to be used in the supported form the clear green solution of vanadyl chloride and telluric acid is applied to the support using a volume just sufficient to saturate completely the surface and pores of the support material. The wet catalyst and support are then dried at about 110° C. for several hours to remove water and obtain substantial hydrolysis of the vanadyl chloride.

Other suitable methods for the preparation of the promoted or mixed vanadium-tellurium catalyst comprising about 2 to about 40, preferably about 5 to about 20 mole per cent oxide of vanadium and the balance predominantly at least one oxide of tellurium may be employed. For example, vanadium pentoxide and tellurium dioxide in the proportions necessary to afford about 2 to about 40, preferably about 5 to about 20 mole per cent oxide of vanadium (based upon the tellurium oxide) can be dissolved simultaneously in concentrated aqueous hydrochloric acid to form a mixture of oxychlorides which can then either be hydrolyzed by moist air or steam to yield the mixed oxides and dried or the solution of the mixed oxychlorides can be applied to a support and then hydrolyzed and dried.

Illustrative but not limiting of the present invention are the following examples of runs made to demonstrate the improved results obtained with the novel promoted or mixed catalysts comprising or consisting essentially of about 2 to about 40, preferably about 5 to about 20, mole per cent oxide of vanadium and the balance predominantly at least one oxide of tellurium.

The catalysts employed in Examples I through VII were used with fused alumina as the support. The supporting material of the catalysts used in Examples VIII through XII was tempered silica gel.

Table I

Compound having an activated methyl group—Propylene.
Ratio of gas containing free oxygen (air) to propylene=3:1.
Total gas space velocity=4.
Propylene space velocity=1.
Catalyst support—fused alumina.

| Example No | I | II | III | IV | V | VI | VII |
|---|---|---|---|---|---|---|---|
| Mole percent $VO_x$ | 5.0 | 5.0 | 5.0 | 5.0 | 5.0 | | |
| Gms. $TeO_x$/100 cc. of support | 10 | 10 | 10 | 10 | 10 | 10 | 10 |
| Catalyst Temp. Range, ° F | 750–752 | 752–4 | 700 | 753–4 | 705 | 752–6 | 700 |
| Max. obs. Temp. Rise, ° F | 3 | 2 | <1 | 2 | 1 | 4 | <1 |
| Conversion, Mole percent [1] | 4.8 | 3.8 | 2.2 | 3.2 | 1.9 | 1.6 | 0.95 |

[1] Mole percent propylene converted to acrolein per pass.

For facility of comparison the mole per cent of propylene converted to acrolein per pass and the maximum observed temperature rise in the catalyst bed for Examples I through VII are presented in Table II.

Table II

| Example No. | Reaction Temp., °F. | Mole Percent Conversion | | Maximum Observed Temperature Rise, °F. | |
|---|---|---|---|---|---|
| | | 5 Mole Percent VOₓ | No VOₓ | 5 Mole Percent VOₓ | No VOₓ |
| VII | 700 | | 0.95 | | <1 |
| III | 700 | 2.2 | | <1 | |
| V | 705 | 1.9 | | 1 | |
| VI | 752-6 | | 1.6 | | 4 |
| I | 750-2 | 4.8 | | 3 | |
| II | 752-4 | 3.8 | | 2 | |
| IV | 753-4 | 3.2 | | 2 | |

It will be noted that in the reaction temperature range 700°–705° F. that the conversion in the presence of 5 mole per cent VOₓ is about 200 per cent of that obtained with an unpromoted tellurium catalyst while the maximum observed temperature rise in the catalyst bed is approximately the same. Similarly in the reaction temperature range 750°–756° F. the mole per cent conversion of propylene to acrolein per pass in the presence of 5 mole per cent VOₓ is about 250 per cent of that obtained with an unpromoted tellurium catalyst while the maximum observed temperature rise in the catalyst bed of promoted tellurium is only about 50 per cent of that observed with an unpromoted tellurium catalyst.

Table III

Compound having an activated methyl group—propylene.
Ratio of gas containing free oxygen to propylene—3:0.
Total gas space velocity—4.0.
Propylene space velocity—Examples VIII, IX, XI and XII—1.0; Example X—2.0.
Catalyst support—tempered silica gel.

| Example No. | VIII | IX | X | XI | XII |
|---|---|---|---|---|---|
| Mole percent VOₓ | 5 | 5 | 5 | | |
| Gms. TeO/100 cc. support [1] | 10 | 10 | 10 | 10 | 10 |
| Catalyst Temp., °F | 696 | 709 | 748 | 707 | 700 |
| Max. obs. Temp. Rise, °F | 74 | 70 | 121 | 45 | 45 |
| Conversion, Mole percent per pass [2] | 10.3 | 8.5 | 11.8 | 5.5 | 5.6 |

[1] Calculated as TeO₂.
[2] Propylene to acrolein.

It will be noted that in the temperature range 696° to 709° F. the mole per cent conversion of propylene to acrolein with the promoted tellurium catalyst is about 170 per cent of that obtained with the unpromoted catalyst while the maximum observed temperature rise per mole percent of propylene converted to acrolein is about the same.

The supports can be of the inert type or the "active" type. Inert supports are those such as "fused" alumina which per se do not accelerate oxidation reactions. "Active" supports are those which, like silica gel, per se accelerate the oxidation of olefins to CO, CO₂ and H₂O. It will be understood that when a "tellurium" catalyst supported on an "active" support is used, there is a tendency for a greater proportion of the reactant or reactants to be converted to the products of ultimate oxidation. Other materials which may be used for supporting the finely divided tellurium are silicon carbide aggregate, porous porcelain, alundum and the like.

Reaction temperatures between the normal boiling point and the temperature of decomposition of the organic substance to be oxidized can be used. For many reactions temperatures of about 200° to about 550° C. have been found useful but optimum temperatures will be dependent upon the individual conditions encountered. Thus, for example, the preferred temperature for the conversion of propylene to acrolein is about 350° C. to about 425° C. while the preferred temperature for the conversion of isobutylene to methacrolein is about 220° to about 380° C.

While the conversions described hereinbefore were all carried out at atmospheric pressure, any reasonable pressure including sub-atmospheric pressures can be used.

The organic substance to oxidizing gas ratio can be varied over a wide range although it is preferred to use ratios of about 1:1 to about 1:9.

Broadly defined, the substances which can be oxidized with air or other gas containing free oxygen in the presence of non-stoichiometric quantities of finely divided catalyst comprising predominant at least one oxide of tellurium, are those having hydrogen atoms attached to a carbon atom alpha to an unsaturated carbon atom such as in olefins of three or more carbon atoms; isolated diolefins; i. e., diolefins in which there is at least one methylene or substituted methylene group between the olefinic carbons; acetylenic hydrocarbons having at least three carbon atoms; conjugated diolefins of more than four carbon atoms; cycloolefins, for example, cyclopentadiene; aromatic hydrocarbons, such as xylene, methyl naphthalenes, methyl anthracenes and the like, or alpha to a hydroxyl group, such as ethanol, propanol, pentanol, isopentanol, octanol, octadecanol, octadecenol, ethandiol, propandiol, butylene, glycol, pentylene glycol, octandiol and in general hydrocarbons, substituted hydrocarbons and primary and secondary alcohols of up to 22 carbon atoms. For example, paraffin wax (18–24 carbon atoms) can be halogenated, dehydrohalogenated to the olefinic form and then oxidized.

Thus, for example, substituted butadiene derivatives, conforming to the general formula,

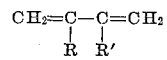

wherein R and R' are alkyl or aryl groups substituted or unsubstituted can be oxidized in the manner described hereinbefore and converted to the corresponding carbonyl compounds.

Thus, for example, 1,3-butadiene, 1,3-pentadiene (alpha-methylbutadiene) 1,4-pentadiene, 2-methyl-1,3-butadiene (isoprene), 1,5-hexadiene (diallyl), 2-methyl-1,4-pentadiene (isodiallyl), 2,3-dimethyl-1,3-butadiene (diisopropenyl), 3-methyl-1,3-hexadiene, 3-methyl-2,4-hexadiene, 2,7-heptadiene, 4-methyl-1,6-heptadiene, 2,5-dimethyl-2,4-hexadiene, 3-methyl-1,5-octadiene, 1,4-nonadiene, 3,7-decadiene can be oxidized with air in the presence of finely divided catalyst comprising predominantly at least one oxide of tellurium at temperatures of about 350° to about 550° C. or generally at temperatures at which the diolefin is gaseous but below the cracking temperature of the diolefin to the corresponding carbonyl compounds.

Illustrative of another group of hydrocarbons which can be oxidized to the corresponding carbonyl compounds in gaseous phase with pure or diluted gaseous oxygen in the presence of the "tellurium" catalyst at temperatures at which the hydrocarbon is gaseous but below the cracking temperature of the hydrocarbon are the following members of the acetylene series: 2-butyne, 2-pentyne, 2-hexyne, 3-hexyne, 4-methyl-2-pentyne, 3-heptyne, 5-methyl-2-hexyne, 4,4 - dimethyl - 2 - pentyne, 5 - methyl - 5 - ethyl-3-heptyne, 2-undecyne, 6-dodecyne, 2-hexadecyne, 9-octadecyne.

Illustrative of the aromatic hydrocarbons which can be oxidized to the corresponding carbonyl compounds by air in the presence of the "tellurium" catalyst at temperatures between the normal boiling point of the hydrocarbon and the cracking temperature thereof are trimethylbenzene, o-ethyltoluene (1-methyl-2-ethylbenzene) 1-methyl-2-propyl-benzene, 1,3-dimethyl-4-ethylbenzene, tetra-methylbenzene, 1-methyl-4 - isobutylbenzene, 1,2 - dimethyl - 4 - propyl-benzene,1,2,4 - trimethyl - 5 - ethylbenzene, 1 - methyl-3-amylbenzene, 1,3-dimethyl-4,6-diethylbenzene, 1 - methyl - 2 - propyl - 4 - isopropyl-benzene, 1,3,5-trimethyl-2,4-dimethylbenzene, alpha and beta styrene, 1-phenyl-1,3-butadiene, 1-methyl-4-propenylbenzene, 1-phenyl-2-pentene, dimethyl naphthalene, dimethylanthracene, dimethylphenanthrene or the like.

Illustrative of the cyclo-olefins which can be oxidized to the corresponding carbonyl compounds by air in the presence of the "tellurium" catalyst at temperatures between the boiling point and the cracking temperature of the cyclo-olefin are 1-methyl-1-cyclobutene, 1-methyl-1-cyclopentene, 1,2 - dimethyl - 1 - cyclopentene, 1-methyl - 2 - ethyl - 1 - cyclopentene, 1 - methyl-2-propyl-cyclopentene, 1,2-dimethyl-1-cyclohexene, and 1-ethyl-3-methyl-1-cyclohexene.

Illustrative of the organic compounds, having a methyl or methylene group activated by the presence of a hydroxyl group, which can be oxidized to the corresponding carbonyl compounds by gaseous oxygen (pure or diluted), ozone and air in the presence of the "tellurium" catalyst at temperatures between the boiling point of the compound and the temperature at which said compound cracks or decomposes are the following: glycol, propandiol-1,2; propandiol-1,3; 1,2-dihydroxybutane, 1,4-dihydroxybutane, 2,3-dihydroxyhexane and the like. Monohydroxy compounds such as the aliphatic alcohols, ethanol, butanol, propanol, hexanol, octanol and the like can also be oxidized to the corresponding carbonyl compounds by gaseous oxygen in the presence of the "tellurium" catalyst at temperatures between the boiling point of the alcohol and the temperature at which the alcohol decomposes.

A characteristic of the catalyst disclosed hereinbefore is its capacity to promote the oxidation of methyl or methylene groups directly adjacent to a center of unsaturation in an organic compound such as, for example, the unsaturation found in aromatic compounds, olefins or carbonyl groups. A further distinguishing feature is the fact that although the catalyst catalyzes the oxidation of such methyl and methylene groups to carbonyl groups, =C=O or

it does not catalyze the oxidation of carbonyl groups to higher states of oxidation. Thus, it is specific for the following transformations:

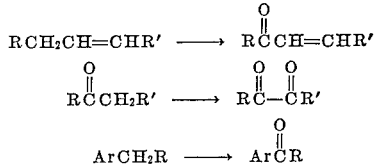

Compounds intermediate between the above reactants and the products in oxidation state such as, for example, benzyl alcohol, allyl alcohol and the like also can be oxidized using the technique disclosed hereinbefore. Ethylene can be oxidized to glyoxal and anthracene to anthraquinone as can organic substances which form in situ reactants such as those the oxidation of which has been discussed herein or their intermediate oxidation products through dehydrogenation, dehydration, rearrangement, dehalogenation, dehydrohalogenation and similar reactions, for instance, methyl cyclohexadiene, tertiary butanol, beta-pinene, 2,3-diiodopropane and alpha-bromodiethylketone.

Similarly mixtures of compounds having an activated methyl or methylene group with other compounds can be used as well as the pure compound. Thus, for example, the propylene-propane fraction of refinery gas containing about 52 mole per cent propylene, about 46 mole per cent propane and the balance higher and lower molecular weight alkanes and alkenes can be mixed with air and the propylene oxidized to acrolein in the presence of a novel catalyst such as has been described hereinbefore.

I claim:
1. A process for oxidizing a hydrocarbon containing a radical selected from the group consisting of methyl and methylene radicals directly adjacent to an unsaturated carbon to carbon linkage, whereby said radical is selectively oxidized to a carbonyl group, which comprises contacting said hydrocarbon in the vapor state with an oxygen-containing gas in the presence of a catalyst consisting essentially of an oxide of tellurium and about 2 to about 40 mole per cent of an oxide of vanadium.

2. A process for oxidizing a hydrocarbon having at least one unsaturated carbon to carbon linkage and containing a radical selected from the group consisting of methyl and methylene radicals, said radicals being adjacent to an unsaturated carbon to carbon linkage, which comprises contacting said hydrocarbon with an oxidizing gas at a temperature between about 200° C. and about 550° C. in the presence of a catalyst consisting essentially of an oxide of tellurium and about 2 to about 40 mole per cent of an oxide of vanadium, whereby said radical is selectively oxidized to a carbonyl group.

3. A process for oxidizing an olefinic hydrocarbon containing a radical in alpha position to a carbon to carbon double bond and selected from the group consisting of methyl and methylene radicals, which comprises contacting said olefinic hydrocarbon in the vapor state with a gas containing free oxygen in the presence of a catalyst consisting essentially of an oxide of tellurium and about 5 to about 20 mole per cent of an oxide of vanadium, whereby said radical is selectively oxidized to a carbonyl group.

4. A process for oxidizing an aromatic hydrocarbon containing a radical in alpha position to a carbon to carbon double bond and selected from the group consisting of methyl and methylene radicals, which comprises contacting said aromatic hydrocarbon in the vapor state with a gas containing free oxygen in the presence of a catalyst consisting essentially of an oxide of tellurium and about 2 to about 40 mole per cent of an oxide of vanadium, whereby said radical is selectively oxidized to a carbonyl group.

5. A process for oxidizing an unsaturated hydrocarbon characterized by the presence of at least one radical selected from methyl and methylene groups which are activated by the proximity thereto of an unsaturated carbon to carbon linkage, which comprises contacting said compound at a temperature between the normal boiling point and decomposition temperature thereof with a gas containing free oxygen in the presence of a catalyst consisting essentially of an oxide of tellurium and about 2 to about 40 mole per cent of an oxide of vanadium.

6. A process for selectively oxidizing propylene to acrolein, which comprises contacting propylene vapor with an oxygen-containing gas in the presence of a catalyst consisting essentially of an oxide of tellurium and about 2 to about 40 mole per cent of an oxide of vanadium.

7. A novel catalyst consisting essentially of about 2 to about 40 mole per cent of an oxide of vanadium and an oxide of tellurium.

7. A novel catalyst consisting essentially of about 5 to about 20 mole per cent of an oxide of vanadium and an oxide of tellurium.

9. The catalyst described and set forth in claim 7, wherein the catalyst is deposited on a silica gel support.

10. The catalyst described and set forth in claim 7, wherein the catalyst is deposited on a fused alumina support.

References Cited in the file of this patent

UNITED STATES PATENTS

| Number | Name | Date |
|---|---|---|
| 2,383,711 | Clark et al. | Aug. 28, 1945 |
| 2,530,923 | Turk et al. | Nov. 21, 1950 |